US011429461B2

(12) United States Patent
Huang et al.

(10) Patent No.: US 11,429,461 B2
(45) Date of Patent: *Aug. 30, 2022

(54) BROADCAST CONTROL METHOD AND APPARATUS, AND TERMINAL

(71) Applicant: HUAWEI TECHNOLOGIES CO., LTD., Guangdong (CN)

(72) Inventors: Wen Huang, Beijing (CN); Yuhua Guo, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 352 days.

This patent is subject to a terminal disclaimer.

(21) Appl. No.: 16/803,476

(22) Filed: Feb. 27, 2020

(65) Prior Publication Data
US 2020/0192729 A1 Jun. 18, 2020

Related U.S. Application Data

(63) Continuation of application No. 16/089,447, filed as application No. PCT/CN2016/077844 on Mar. 30, 2016, now Pat. No. 10,635,510.

(51) Int. Cl.
G06F 9/54 (2006.01)
G06F 9/46 (2006.01)
G06F 9/48 (2006.01)
H04W 52/02 (2009.01)

(52) U.S. Cl.
CPC ............... *G06F 9/544* (2013.01); *G06F 9/46* (2013.01); *G06F 9/48* (2013.01); *G06F 9/542* (2013.01); *H04W 52/0264* (2013.01); *G06F 2209/548* (2013.01)

(58) Field of Classification Search
None
See application file for complete search history.

(56) References Cited

U.S. PATENT DOCUMENTS

| 2006/0212920 | A1 | 9/2006 | Yamaguchi et al. |
| 2007/0248088 | A1 | 10/2007 | Lim |
| 2008/0050117 | A1 | 2/2008 | Koley |
| 2010/0299702 | A1 | 11/2010 | Lo et al. |
| 2016/0323170 | A1 | 11/2016 | Hu et al. |

FOREIGN PATENT DOCUMENTS

| CN | 102428688 A | 4/2012 |
| CN | 103368914 A | 10/2013 |
| CN | 103595547 | 2/2014 |

(Continued)

OTHER PUBLICATIONS

International Search Report and Written Opinion issued in International Application No. PCT/CN2016/077844 dated Dec. 22, 2016, 19 pages.

(Continued)

*Primary Examiner* — Craig C Dorais
(74) *Attorney, Agent, or Firm* — Fish & Richardson P.C.

(57) ABSTRACT

Embodiments of the present disclosure relate to a broadcast control method and apparatus, and a terminal device. The method includes: when the one or more application programs run on a background and meet a first preset condition, sending a first control instruction; and when the first control instruction is received, freezing and buffering a broadcast to be sent to the one or more application programs.

9 Claims, 7 Drawing Sheets

(56) References Cited

FOREIGN PATENT DOCUMENTS

| | | |
|---|---|---|
| CN | 104516806 A | 4/2015 |
| CN | 104601341 A | 5/2015 |
| CN | 104991803 A | 10/2015 |
| CN | 105094285 A | 11/2015 |

OTHER PUBLICATIONS

Office Action issued in Chinese Application No. 201680009868.5 dated Aug. 9, 2019, 20 pages (With English Translation).
Office Action issued in Chinese Application No. 201680009868.5 dated Mar. 16, 2020, 17 pages (with English translation).

BROADCAST CONTROL METHOD AND APPARATUS, AND TERMINAL

CROSS-REFERENCE TO RELATED APPLICATIONS

This application is a continuation of U.S. patent application Ser. No. 16/089,447, filed on Sep. 28, 2018, which is a national stage of International Application No. PCT/CN2016/077844, filed on Mar. 30, 2016. All of the aforementioned applications are hereby incorporated by reference in their entireties.

TECHNICAL FIELD

The present invention relates to the field of mobile communications technologies, and in particular, to a broadcast control method and apparatus, and a terminal.

BACKGROUND

As one of four components of an Android system, a broadcast is an inter-process communication mechanism, and is widely used in many operating systems. The broadcast may be used to transmit data, send a notification, and the like. However, because the broadcast is widely used, some unavoidable problems arise. For example, when an application runs on a background, although the application is temporarily not used by a user, the application can frequently receive a broadcast, and implement self-running by using the broadcast. This causes power consumption of a terminal device.

SUMMARY

Embodiments of the present invention provide an intelligent broadcast control method and apparatus, and a terminal.

According to a first aspect, the present invention provides a broadcast control method. The method is applied to a terminal. A first application runs in an operating system of the terminal. The method includes:

when the first application runs on a background of the operating system of the terminal, obtaining a first broadcast to be sent to the first application; and buffering the first broadcast and stopping sending the first broadcast to the first application.

With reference to the first aspect, in a first possible implementation of the first aspect, before the buffering the first broadcast and stopping sending the first broadcast to the first application, the method further includes:

determining that a running characteristic of the first application meets a first preset freezing condition, where the running characteristic of the first application includes a background continuous runtime of the first application in the operating system of the terminal, and the first preset freezing condition includes that a background continuous runtime of an application is greater than a preset runtime.

With reference to the first aspect or the first possible implementation of the first aspect, in a second possible implementation of the first aspect, before the buffering the first broadcast and stopping sending the first broadcast to the first application, the method further includes:

determining that the first broadcast belongs to a preset frozen broadcast, where the preset frozen broadcast includes at least one of a preset system broadcast or a preset second-application broadcast.

With reference to the first aspect or the first possible implementation of the first aspect, in a third possible implementation of the first aspect, before the buffering the first broadcast and stopping sending the first broadcast to the first application, the method further includes:

determining that a running characteristic of the first broadcast meets a second preset freezing condition, where the running characteristic of the first broadcast includes a receiver quantity of the first broadcast, and the second preset freezing condition includes that a receiver quantity of a broadcast is greater than a preset receiver quantity; or determining that a running characteristic of the first broadcast meets a second preset freezing condition, where the running characteristic of the first broadcast includes transmission frequency of the first broadcast, and the second preset freezing condition includes that transmission frequency of a broadcast is higher than preset transmission frequency.

With reference to any one of the first aspect to the third possible implementation of the first aspect, in a fourth possible implementation of the first aspect, after the buffering the first broadcast and stopping sending the first broadcast to the first application, the method further includes:

unfreezing the first broadcast and sending the first broadcast to the first application.

With reference to the fourth possible implementation of the first aspect, in a fifth possible implementation of the first aspect, before the unfreezing the first broadcast, the method further includes: detecting that the first application is switched from the background of the operating system of the terminal to a foreground to run.

With reference to the fourth possible implementation of the first aspect, in a sixth possible implementation of the first aspect, before the unfreezing the first broadcast, the method further includes: obtaining a second broadcast to be sent to the first application, where the second broadcast belongs to a preset important broadcast.

With reference to any one of the first aspect to the third possible implementation of the first aspect, in a seventh possible implementation of the first aspect, after the buffering the first broadcast, the method further includes:

obtaining a third broadcast to be sent to the first application;

determining whether the third broadcast and the first broadcast belong to a same type of broadcast; and if the third broadcast and the first broadcast belong to a same type of broadcast, buffering the third broadcast and deleting the buffered first broadcast.

According to a second aspect, the present invention provides a broadcast control apparatus. A first application runs in an operating system of a terminal. The apparatus includes:

a broadcast obtaining module, configured to: when the first application runs on a background of the operating system of the terminal, obtain a first broadcast to be sent to the first application; and a broadcast distribution module, configured to buffer the first broadcast and stop sending the first broadcast to the first application.

With reference to the second aspect, in a first possible implementation of the second aspect, the broadcast distribution module is further configured to determine that a running characteristic of the first application meets a first preset freezing condition, where the running characteristic of the first application includes a background continuous runtime of the first application in the operating system of the terminal, and the first preset freezing condition includes that a background continuous runtime of an application is greater than a preset runtime.

With reference to the second aspect or the first possible implementation of the second aspect, in a second possible implementation of the second aspect, the broadcast distribution module is further configured to determine that the first broadcast belongs to a preset frozen broadcast, where the preset frozen broadcast includes at least one of a preset system broadcast or a preset second-application broadcast.

With reference to the second aspect or the first possible implementation of the second aspect, in a third possible implementation of the second aspect, the broadcast distribution module is further configured to determine that a running characteristic of the first broadcast meets a second preset freezing condition, where the running characteristic of the first broadcast includes a receiver quantity of the first broadcast, and the second preset freezing condition includes that a receiver quantity of a broadcast is greater than a preset receiver quantity; or determine that a running characteristic of the first broadcast meets a second preset freezing condition, where the running characteristic of the first broadcast includes transmission frequency of the first broadcast, and the second preset freezing condition includes that transmission frequency of a broadcast is higher than preset transmission frequency.

With reference to any one of the second aspect to the third possible implementation of the second aspect, in a fourth possible implementation of the second aspect, the broadcast distribution module is further configured to: unfreeze the first broadcast and send the first broadcast to the first application.

With reference to the fourth possible implementation of the second aspect, in a fifth possible implementation of the second aspect, the broadcast distribution module is further configured to detect that the first application is switched from the background of the operating system of the terminal to a foreground to run.

With reference to the fourth possible implementation of the second aspect, in a sixth possible implementation of the second aspect, the broadcast distribution module is further configured to obtain a second broadcast to be sent to the first application, where the second broadcast belongs to a preset important broadcast.

With reference to any one of the second aspect to the third possible implementation of the second aspect, in a seventh possible implementation of the second aspect, the broadcast distribution module is further configured to: obtain a third broadcast to be sent to the first application;

determine whether the third broadcast and the first broadcast belong to a same type of broadcast; and if the third broadcast and the first broadcast belong to a same type of broadcast, buffer the third broadcast and delete the buffered first broadcast.

According to a third aspect, an embodiment of the present invention provides a terminal. The terminal includes a processor, a memory, a system bus, and a communications interface. The processor, the memory, and the communications interface are connected by using the system bus, one or more programs are stored in the memory and executed by the processor, and the one or more programs include all instructions used to perform the broadcast control method in the first aspect.

Based on the foregoing technical solutions, according to the broadcast control method and apparatus, and the terminal provided in the embodiments of the present invention, when it is identified that one or more application programs are running on a background, and meet a specific condition, a broadcast that is to be received by the one or more application programs is frozen. In this way, the following problems are resolved: The one or more application programs frequently receive a broadcast on the background, and this causes a system to get stuck; excessive power consumption of a terminal device causes the terminal device heated; and the like. In addition, system performance is further improved. When the one or more application programs are switched from the background to a foreground to run, and/or meet an unfreezing condition, the broadcast for the one or more application programs may be unfrozen. Therefore, the one or more application programs can conveniently process the broadcast to be received by the one or more application programs.

DESCRIPTION OF EMBODIMENTS

The technical solutions of the present invention are further described in detail with reference to accompanying drawings and embodiments as follows:

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
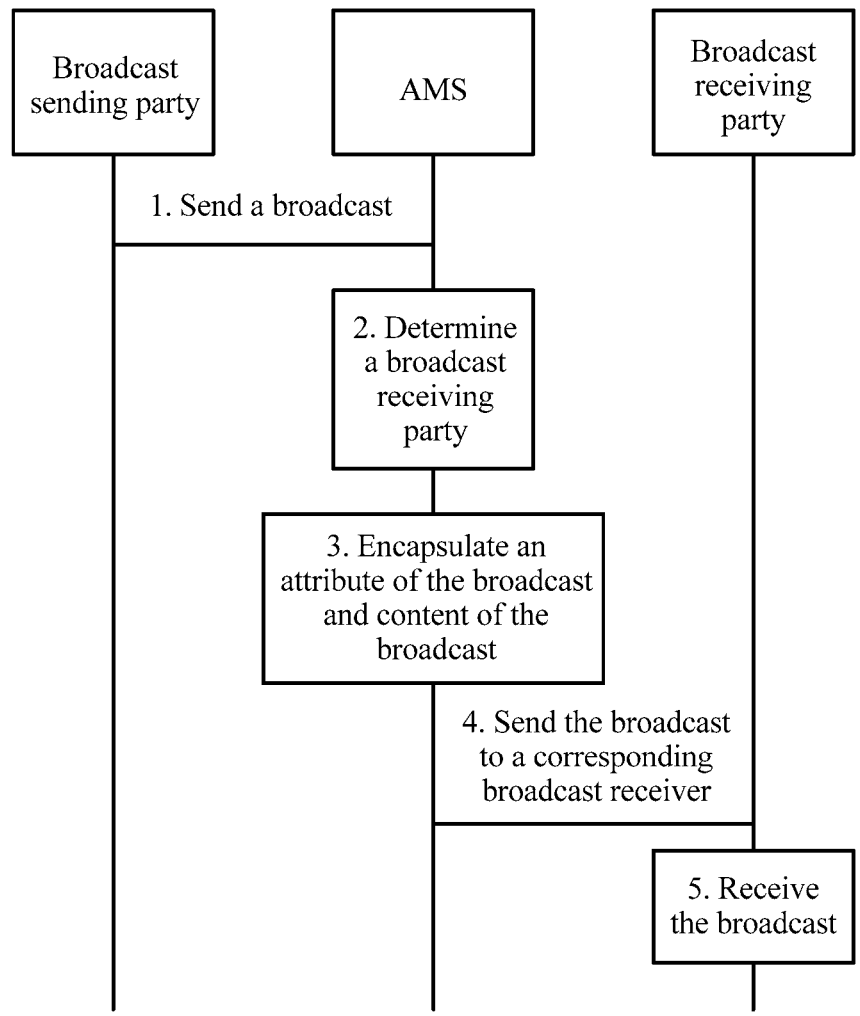
FIG. 1 is a signaling flowchart of sending a broadcast in the prior art.

A broadcast is a message-passing mechanism, and has a sending party and a receiving party. Both the sending party and the receiving party may be system application programs in a terminal or third-party application programs in a terminal. In the prior art, a sending party sends a broadcast message that may have multiple receiving parties. The receiving party may specify which broadcasts to be received. The sending party may also specify which receiving parties a broadcast to be sent. The receiving party may run on a background or update its own status after receiving the broadcast. If sending parties or receiving parties are specified, after receiving a broadcast of a sending party, a broadcast distribution module does not need to query which receiving party needs to receive the broadcast one by one, but directly sends the broadcast to a specified receiving party. Certainly, if the sending party does not specify which receiving parties to receive the broadcast, or the receiving party does not specify which sending parties to send the broadcast, the broadcast is sent to the broadcast distribution module of the terminal by the sending party, and the broadcast distribution module distributes the broadcast to a corresponding receiving party (before broadcast receiving and sending, the receiving party has registered in advance which broadcasts to be received, and when a processor receives these broadcasts, the broadcast distribution module automatically distributes these broadcasts to corresponding applications). An Android operating system is used as an example, and a specific broadcast distributing process is shown in FIG. 1. FIG. 1 is a signaling flowchart of sending a broadcast in an Android operating system in the prior art.

Specifically, an ActivityManagerService (AMS for short) system service provided by the Android operating system is used to manage various actions of an activity in the Android operating system, control a life cycle of the activity, distribute a message event, perform low-memory management, and the like. The AMS implements an IBinder interface that may be used for inter-process communication. An Android broadcast is divided into two aspects: a broadcast sender and a broadcast receiver. Generally, BroadcastReceiver is the broadcast receiver (or a broadcast receiver). As a communication mode among Android components, the broadcast may be used in the following scenarios:

1. Message communication in a same component in a same app (in a single thread or among multiple threads);
2. Message communication among different components in a same app (single process);
3. Message communication among different components that have multiple processes and that are in a same app;
4. Message communication among components of different apps; and
5. Message communication between the Android system and an app in a specific case: Each broadcast has its own identifier that helps the AMS to identify a type of the broadcast and a specific receiver to which the broadcast needs to be sent. After determining a broadcast receiving party, the AMS encapsulates attributes of the broadcast (for example, a process ID and/or a user ID of a broadcast sending party, the broadcast sending party, a broadcast receiving party, and a process ID and/or a user ID of the broadcast receiving party) and content of the broadcast, so as to form a broadcast record. The AMS first determines the type of the broadcast, for example, the broadcast is an ordered broadcast or an unordered broadcast. If the broadcast is an ordered broadcast, the broadcast record is added to an ordered broadcast buffering queue, and then the broadcast record is sent to a corresponding broadcast receiving party in sequence. A specific implementation principle is as follows:

1. A broadcast receiver BroadcastReceiver registers with the AMS (Activity Manager Service) by using a binder mechanism.
2. A broadcast sender sends a broadcast to the AMS by using the binder mechanism.
3. The AMS searches for a BroadcastReceiver that conforms to a corresponding condition (such as IntentFilter/Permission), and sends the broadcast to a message loop queue corresponding to the BroadcastReceiver (usually, the Activity).
4. A message loop obtains the broadcast, an onReceive( )method in the BroadcastReceiver is called back, and the broadcast is sent to a corresponding broadcast receiver.

In the prior art, the AMS does not deliberately identify a current running status of the broadcast receiving party, that is, whether an application program is running on a foreground or a background. Therefore, when the application runs on the background, although the application is temporarily not used by a user, the application can still frequently receive a broadcast, and implement self-running by using the broadcast, and this causes power consumption of a terminal device.

Figure 2:
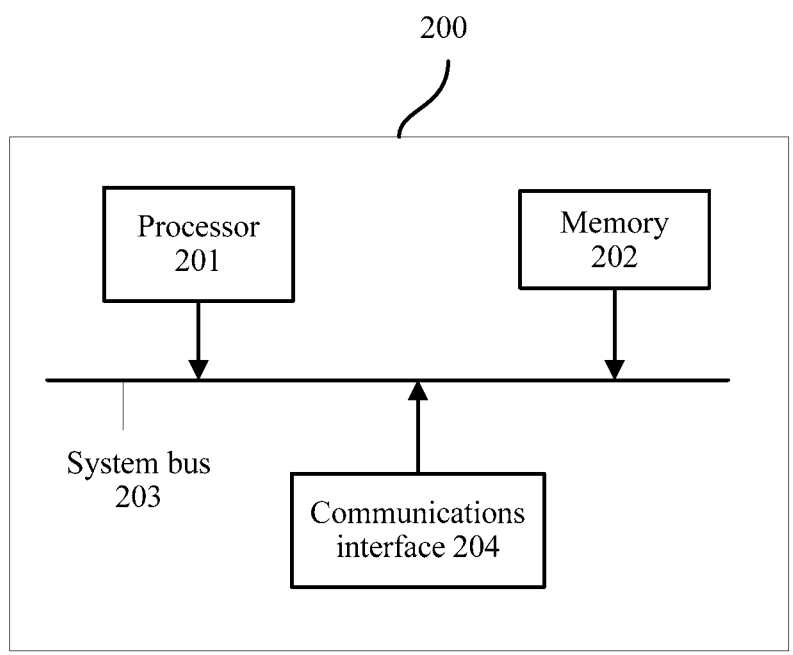
FIG. 2 is a system architecture diagram of a terminal according to an embodiment of the present invention.

Therefore, to resolve the foregoing technical problems, in the present invention, a broadcast control method is proposed. The method is mainly applied to a terminal. A first application runs in an operating system of the terminal. As shown in FIG. 2, FIG. 2 is a system architecture diagram 200 of a terminal according to an embodiment of the present invention.

It should be understood that the terminal may be any terminal device, such as a mobile phone and a tablet computer. This is not limited in this application document. The operating system of the terminal may be an Android system or another system, and this is not limited herein either. In a specific embodiment below, this application document uses the Android system as an example for description. An operating manner of another system is similar, and is not limited herein.

The terminal may include a processor 201, a memory 202, a system bus 203, and a communications interface 204.

The processor 201, the memory 202, and the communications interface 204 may implement mutual communications connection by using the bus 203 or may implement communication by other means such as wireless transmission.

The processor 201 may be a central processing unit (English: central processing unit, CPU for short).

The memory 202 may include a volatile memory (English: volatile memory), for example, a random access memory (English: random-access memory, RAM for short). Alternatively, the memory may include a non-volatile memory (English: non-volatile memory), for example, a read-only memory (English: read-only memory, ROM for short), a flash memory, an HDD, or an SSD. Alternatively, the memory 202 may include a combination that includes the foregoing types of memories. When technical solutions provided in this application are implemented by using software, program code that is used to implement a broadcast control method provided in FIG. 4(a) to FIG. 4(c) in this application is stored in the memory 202, and is executed by the processor 201.

Figure 3:
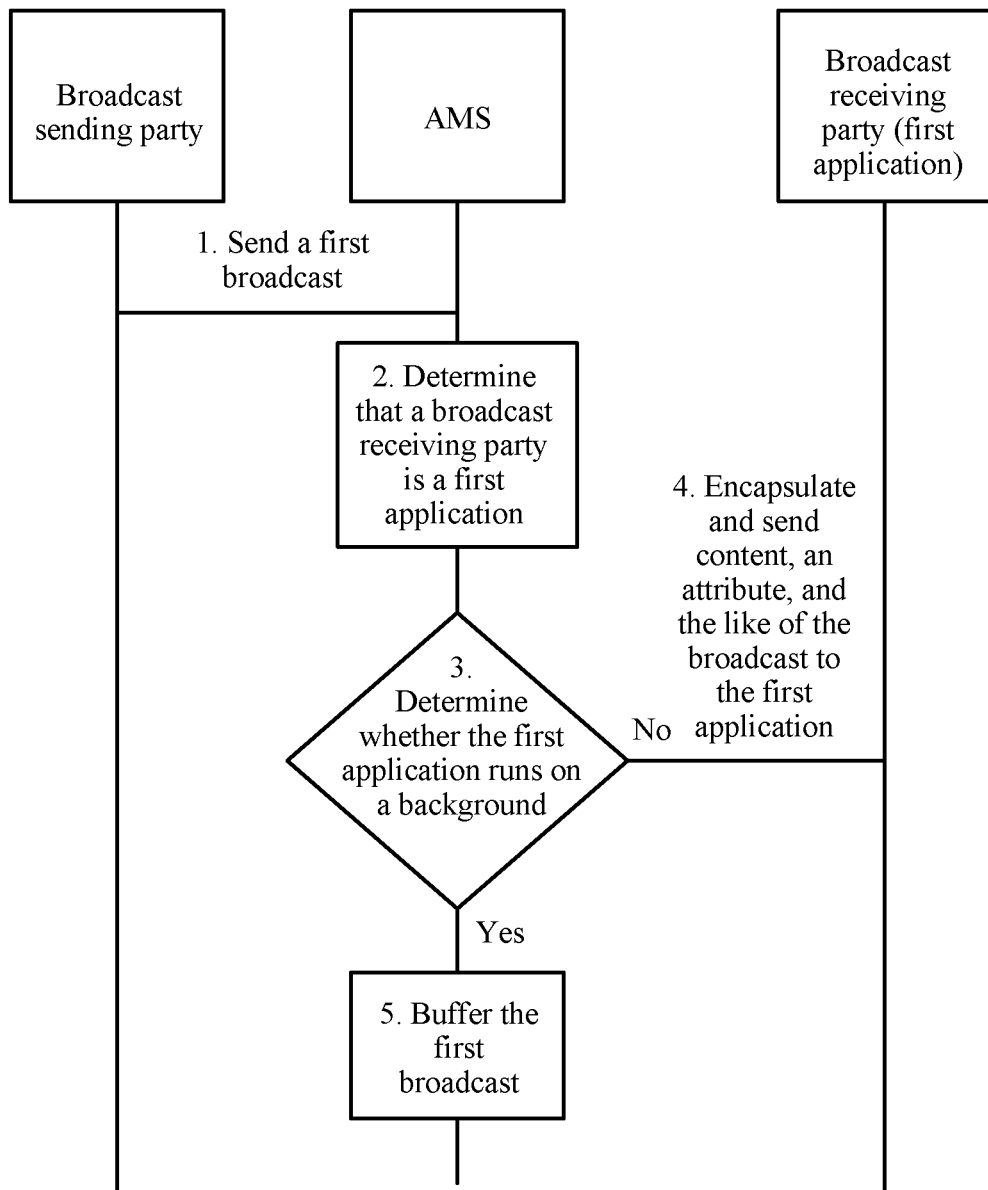
FIG. 3 is a signaling flowchart of sending a broadcast according to an embodiment of the present invention.

In addition, corresponding to FIG. 1, in an embodiment of the present invention, a signaling flowchart of sending a broadcast is further provided, as shown in FIG. 3.

As shown in FIG. 3, when needing to send a broadcast, a broadcast sending party (for example, another application program other than a first application or a system itself) first sends the broadcast to an AMS. The AMS queries a receiving party of the broadcast. When the AMS finds that one of receiving parties of the broadcast is the first application, and the first application is running on a background, in this case, the AMS does not send the broadcast to the first application temporarily, but buffers the broadcast. Specifically, a storage area used to store the broadcast is newly added to the AMS, and is used to freeze sending of the broadcast. Further, the storage area may be specifically divided into an ordered broadcast storage area and an unordered broadcast storage area.

Optionally, a type of the broadcast may be determined first. For example, when a first broadcast is an ordered broadcast, the first broadcast is buffered in the ordered broadcast storage area. When the first broadcast is an unordered broadcast, the first broadcast is buffered in the unordered broadcast storage area.

The broadcast is buffered, and is prevented from being sent to the first application. In this way, the application is prevented from continuously receiving a broadcast when running on the background, thereby reducing system power consumption and greatly improving system performance.

It should be understood that a running status of the application program in an operating system of a terminal may be divided into foreground running and background running. The foreground running refers to direct running on a display window or interface of a display screen. A current interface on which the program runs is displayed, and the program may interact with a user (that is, a user) of the terminal device by using the display interface. The background running means that the display screen does not present a running interface of the application program, but the application program continues to provide a service on the background, and may be switched to the foreground running at any time and displayed on the display screen.

Specifically, an Android operating system is used as an example to describe how the system determines a current running status of an application.

When the application is enabled, the Android system may make an activity of the application be in the running state by invoking a method such as onResume. After the activity of the application is enabled, the activity includes: a resumed Resumed state, a paused Paused state, and a stopped Stopped state. If the activity of the application is in the Resumed state, it may be considered that the application is in the foreground running state. If the activity of the application is in the Paused state, it is considered that the application is in the background running state.

The signaling flowchart of a broadcast control method shown in FIG. 3 merely simply describes technical solutions of the present invention. For specific method steps, refer to the following specific description of a process of a broadcast control method.

Figure 4A:
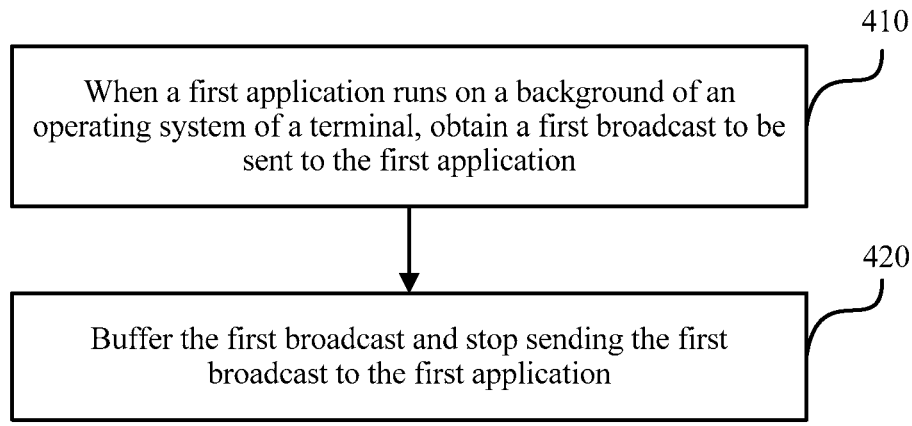
FIG. 4(a) to FIG. 4(c) are a schematic flowchart of a broadcast control method according to an embodiment of the present invention.
Figure 4B:
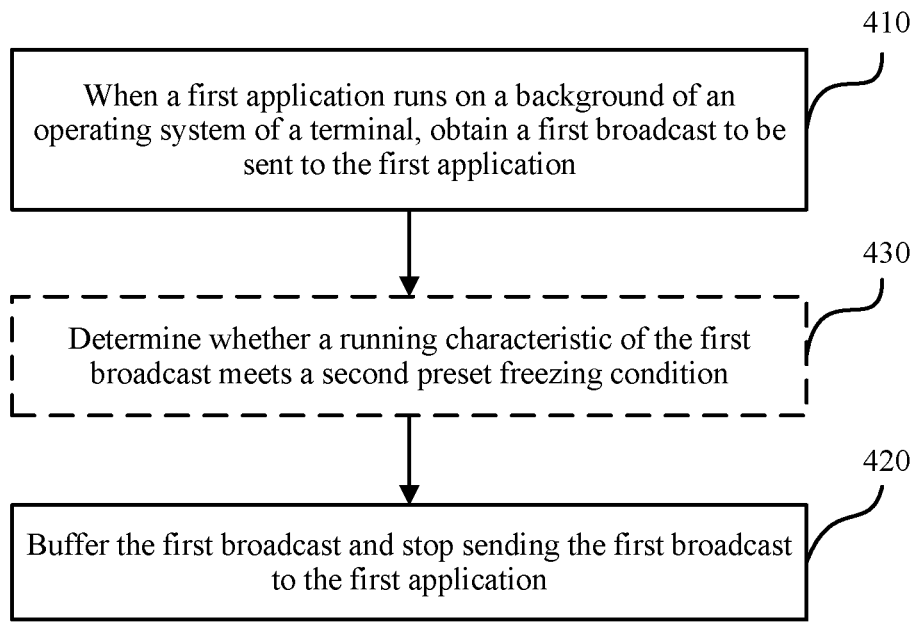
Figure 4C:
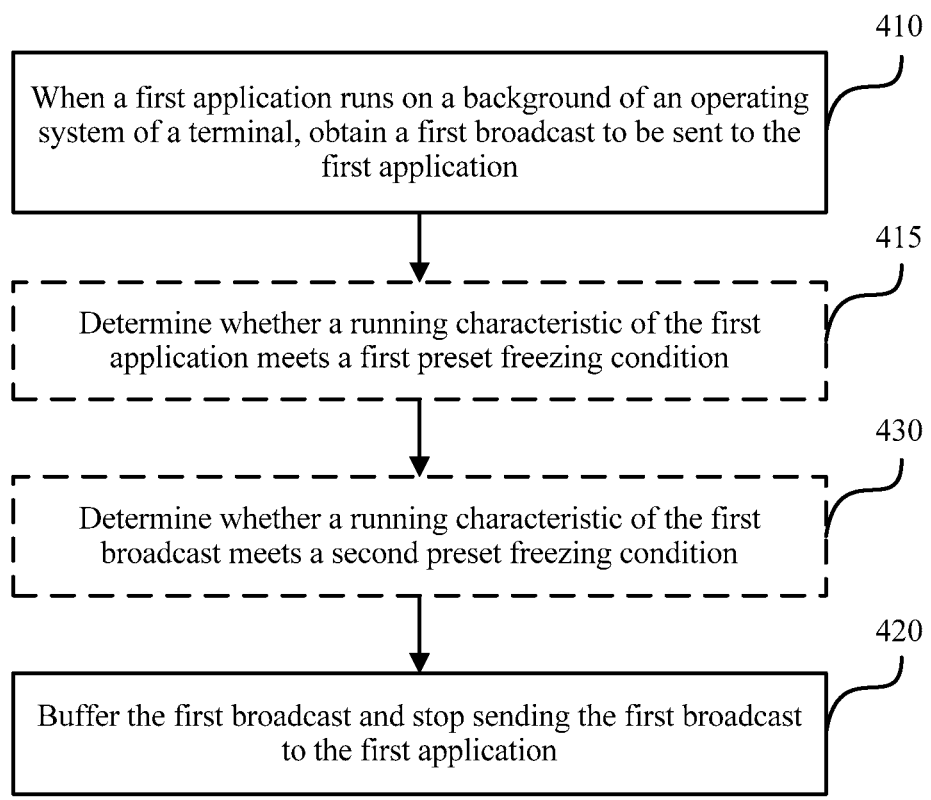

FIG. 4(a) to FIG. 4(c) are a schematic flowchart of a broadcast control method provided in the present invention. The method process is mainly implemented in a software form, but an entity is completed by a processor. A specific operating process is as follows.

S410. When a first application runs on a background of an operating system of a terminal, obtain a first broadcast to be sent to the first application.

S420. Buffer the first broadcast and stop sending the first broadcast to the first application.

Specifically, it can be learned from step 410 that the first application is running on the background. Therefore, after receiving the first broadcast sent by a broadcast sending party, an AMS temporarily buffers the first broadcast and stop sending the first broadcast to the first application.

When an application program runs on the background, the AMS buffers all broadcasts that are to be received by the application program. In this way, the following case may be avoided: The application frequently receives a broadcast when running on the background, and this increases system power consumption and degrades system performance.

Once it is detected that the first application runs on the background, all broadcasts that are to be received by the first application are buffered. However, the first application may be unable to process an important broadcast in time. Therefore, the present invention further proposes another preferable solution to avoid a problem that an application cannot process an important broadcast in time.

Preferably, before the first broadcast is sent to the first application, the method may further include: S415. First, determine whether a running characteristic of the first application meets a first preset condition. For example, if a continuous runtime of the first application on the background of the operating system of the terminal is greater than a preset runtime, buffer the first broadcast and stop sending the first broadcast to the first application.

Further preferably, during broadcast buffering, to avoid increasing system power consumption and reducing system performance, only a broadcast with numerous receivers and a broadcast with extremely high transmission frequency are frozen. Therefore, before step 420, the method may further include: S430. Determine whether a running characteristic of the first broadcast meets a second preset freezing condition.

For example, determine whether a receiver quantity of the first broadcast is greater than a preset receiver quantity; or determine whether transmission frequency of the first broadcast is higher than preset transmission frequency. When the receiver quantity of the first broadcast is greater than the preset receiver quantity, if the first broadcast is sent to multiple receivers at the same time, it is likely to cause a system to get stuck instantaneously, and even cause system power consumption. Similarly, when the transmission frequency of the first broadcast is higher than the preset transmission frequency, a system is caused to get stuck instantaneously, and system power consumption is also caused. Therefore, when the first broadcast belongs to the two types of broadcasts, it is also required to buffer the first broadcast and stop sending the first broadcast to the first application.

Certainly, the first broadcast needs to be buffered not just in the foregoing two cases. The following cases may be further included: If battery level consumption is greater than a preset battery level threshold when the first broadcast is received, or when the received first broadcast causes a system to get stuck instantaneously, the first broadcast also needs to be buffered immediately.

It should be understood that step 430 does not conflict with step 415. Step 430 may be performed after step 410 in the absence of step 415, or may be performed after step 415 in the presence of step 415. Details are shown in FIG. 4 (a), FIG. 4 (b), and FIG. 4 (c). FIG. 4 (a) is a method flowchart that includes only step 410 and step 420. FIG. 4 (b) is a method flowchart that includes step 430, but excludes step 415. FIG. 4 (b) is a method flowchart that includes both step 415 and step 430.

Further preferably, the broadcast may be classified into a system broadcast and a non-system broadcast. The non-system broadcast herein is a broadcast sent by a third-party application program. When determining whether the first broadcast is a broadcast with numerous receivers, or determining whether the first broadcast is a broadcast with extremely high transmission frequency, the AMS can set a broadcast list. The broadcast list includes a preset frozen broadcast. The preset frozen broadcast includes at least one of a preset system broadcast or a preset second-application broadcast. When the first broadcast is being received, whether the first broadcast exists in the broadcast list may first be determined. When the first broadcast exists in the broadcast list, it indicates that the broadcast belongs to the type of broadcast with numerous receivers or with extremely high transmission frequency, and the first broadcast needs to be buffered. Therefore, the AMS can more conveniently process all broadcasts as soon as possible.

In an Android system, the AMS itself can identify which system broadcasts are broadcasts that are sent frequently, such as a broadcast that updates a battery level; which system broadcasts have numerous receivers, such as a screen-on or screen-off broadcast; which system broadcasts likely cause a system to get stuck instantaneously, such as a WiFi broadcast; which system broadcasts have an extremely high rate, or which to-be-received system broadcasts may cause high power consumption (examples are not given one by one herein). These are broadcasts that can be known in advance, and therefore can be configured statically in advance. However, some broadcasts are not sent by the system itself, but sent by a second application. These non-system broadcasts need to be determined by the AMS dynamically.

Therefore, buffering the first broadcast and stopping sending the first broadcast to the first application further include another method: Determine whether the running characteristic of the first broadcast meets the second preset freezing condition. The running characteristic of the first broadcast may be the receiver quantity of the first broadcast, the transmission frequency of the first broadcast, or the like. The preset freezing condition is that a receiver quantity of a broadcast is greater than the preset receiver quantity, or transmission frequency of a broadcast is higher than the preset transmission frequency.

In a specific example, the non-system broadcasts that need to be dynamically determined include: some non-system broadcasts with an extremely high rate, non-system broadcasts with numerous receivers, non-system broadcasts that cause a system to get stuck, and the like. The AMS counts these non-system broadcasts in a fixed time period. For example, for a non-system broadcast that is sent frequently, the AMS counts a quantity of times of sending the broadcast in 10 minutes. For another example, for a type of non-system broadcast, in a distribution process, the AMS counts which applications to which this type of broadcast is sent. When a quantity of applications that receive the broadcast is extremely large, this type of non-system broadcast is buffered. A method that can accurately identify a broadcast sent by a broadcast sending party as any one of the foregoing described broadcasts is to identify an identifier of the broadcast. Each broadcast has its own identifier (for example, an identifier of a WeChat broadcast is: com.tencent.mm.broadcast). After these broadcasts are determined, these broadcasts may be added to the broadcast list. After these broadcasts are added to the broadcast list, these broadcasts become preset second-application broadcasts.

When receiving the first broadcast, the AMS may match the first broadcast with the broadcast list. When determining that the first broadcast belongs to a broadcast in the list, the AMS buffers the first broadcast and stops sending the first broadcast to the first application.

In addition, after the first broadcast is buffered, the method may further include: Step 440. Obtain a third broadcast to be sent to the first application.

When receiving a broadcast, the AMS may receive a same broadcast or a same type of broadcast in different time periods. Therefore, when receiving the third broadcast, the AMS needs to determine whether the third broadcast and the first broadcast belong to a same broadcast or a same type of broadcast. If the third broadcast and the first broadcast belong to a same broadcast or a same type of broadcast, the AMS buffers the third broadcast and deletes the buffered first broadcast.

For the same broadcast described herein, for example, a battery level broadcast, at a first moment, a value of a battery level that is displayed in a battery level broadcast sent by the broadcast sending party is 90%. At a second moment, a value of a battery level that is displayed in a battery level broadcast sent by the broadcast sending party is 70%. The two broadcasts are a same broadcast. If both of them are buffered, a system resource is occupied. The battery level itself needs to be updated in real time. When the battery level broadcast sent at the second moment is received, the battery level broadcast received at the first moment has no meaning. Therefore, when receiving the battery level broadcast in which the battery level displayed is 70%, the AMS may delete the battery level broadcast in which the battery level displayed is 90%, and only buffer the battery level broadcast in which the battery level displayed is 70%.

Similarly, when the received third broadcast and the first broadcast belong to a same type of broadcast, for example, the first broadcast is a screen-on broadcast, and the third broadcast is a screen-off broadcast, only the last updated broadcast of this type of broadcast is buffered. Therefore, the first broadcast may be deleted, and only the third broadcast is buffered. This can greatly save a system resource and improve system performance.

It should be further noted that, a broadcast needs to be frozen possibly only for one application program or several application programs, but does not need to be frozen for another application program. When this broadcast needs to be sent to the another application program, the AMS sends the broadcast to a corresponding application program according to a rule. For example, both Facebook and MSN receive a broadcast with an updated battery level. However, Facebook is running on the background, and meets any one of the foregoing described broadcast freezing conditions. Then, the AMS stops sending the battery level broadcast to Facebook, and buffers the battery level broadcast. The broadcast to be received by MSN does not need to be frozen. Therefore, the broadcast is still sent to MSN.

Corresponding to buffering of the broadcast, in this embodiment of the present invention, a method step of unfreezing the broadcast is further included.

Step 450: Unfreeze the first broadcast and send the first broadcast to the first application.

A specific condition for unfreezing the first broadcast may include: detecting that the first application is switched from the background of the operating system of the terminal to a foreground to run; or obtaining a second broadcast to be sent to the first application, where the second broadcast belongs to a preset important broadcast.

A premise of unfreezing is as follows: When the first application runs on the background, all or some broadcasts received are already frozen. The some broadcasts herein are the type of broadcasts that have numerous receivers, have extremely high transmission frequency, cause a system to get stuck, or the like and that are described in step 430. When the first application is switched from the background to the foreground to run, these broadcasts are unfrozen, and successively sent to a broadcast receiving party by the AMS.

The preset important broadcast may be a call broadcast, an SMS message broadcast, or the like. When there is an incoming call or SMS message, the first application may need to process these broadcasts immediately. A premise of processing these broadcasts is to process a broadcast being buffered currently. Therefore, the AMS first sends the buffered broadcast to the first application. After the first application finishes processing the broadcast, the AMS sends the important broadcast to the first application, so that the first application processes the important broadcast in time.

It should be understood that the conditions for unfreezing the first broadcast include not only the foregoing described two cases, or may be one or more of the following cases.

For example, there is an interdependence relationship between the first application and another application. When the another application needs to be unfrozen, due to the dependence relationship between the first application and the application, the broadcast that is to be received by the first application needs to be unfrozen; and/or a time threshold of a frozen broadcast is greater than a fourth preset threshold; and/or a quantity of frozen broadcasts is greater than a fifth preset threshold; or some abnormal cases are included.

For example, an application program A is bound with a service function of an application program B (for example, when car hailing software is used to pay, a payment function of a mobile bank client may need to be bound), and/or a time period in which the broadcast is frozen is greater than one hour; and/or a quantity of frozen broadcasts is greater than 50. When these conditions are met, the AMS also unfreezes a broadcast that needs to be received by the first application and that is being frozen currently.

Preferably, when unfreezing broadcasts, the AMS may unfreeze the broadcasts according to a sequence of moments of freezing the broadcasts, and then successively process the broadcasts. That is, according to the sequence of moments of freezing the broadcasts, the AMS successively distributes the unfrozen broadcasts to one or more application programs that need to receive these broadcasts until all the frozen broadcasts are processed. Then, an important broadcast that is to be sent is sent to the application program. That is, regardless of a frozen broadcast or an unfrozen broadcast, the AMS processes broadcasts according to a sequence of moments of receiving the broadcasts.

It should be further understood that a broadcast may be classified into an ordered broadcast and an unordered broadcast. Therefore, when receiving a broadcast, the AMS may further classify the broadcast into an ordered broadcast or an unordered broadcast first. If finding that broadcasts in ordered broadcasts need to be frozen, the AMS adds the ordered broadcasts that need to be frozen to an ordered broadcast frozen queue for buffering. If finding that broadcasts in unordered broadcasts need to be frozen, the AMS adds the unordered broadcasts that need to be frozen to an unordered broadcast frozen queue for buffering.

When a frozen broadcast needs to be unfrozen, the broadcast is also classified into an ordered broadcast or an unordered broadcast for unfreezing. After an unordered broadcast is unfrozen, the unordered broadcast may be simultaneously sent to multiple broadcast receiving parties. After ordered broadcasts are unfrozen, it is necessary to send the broadcasts one by one. When one broadcast is sent to a corresponding application program, the AMS needs to receive a success notification instruction sent by the application program, before sending the broadcast to a next corresponding application program, or sending another broadcast to a corresponding application program.

In a specific embodiment, the terminal is described by using a mobile phone as an example. One or more application programs of Facebook, MSN, Skype, and the like are installed in the mobile phone. Facebook and MSN are running on the background, and Skype runs in the foreground.

After receiving a battery level broadcast sent by a broadcast sending party, the AMS determines that the broadcast needs to be sent to Facebook, MSN, and Skype separately. Facebook has been running on the background for more than 5 minutes (it is assumed that a first threshold is 5 minutes), MSN just switches from the foreground to the background to run, and its runtime is within 5 minutes. Skype runs in the foreground all the time. Then, the AMS sends the battery level broadcast separately to MSN and Skype according to the foregoing case. All broadcasts to be received by Facebook need to be buffered. Therefore, the battery level broadcast is not sent to Facebook temporarily, but is buffered in a storage area in a memory. The battery level broadcast is prevented from being sent to Facebook temporarily.

In another specific embodiment, it is assumed that when Skype is installed on the terminal, Skype is also bound to game software, and the software frequently receives a broadcast. A purpose is that, in a process of receiving the broadcast, the software is frequently woken up to download some advertisements and the like. In this way, in an extremely short time period, for example, 30 minutes, a battery level consumed by the game software can reach five percent. The consumed battery level already exceeds a second preset threshold (for example, 4% battery level consumption in one hour).

Alternatively, it is assumed that when Facebook runs on the background, a resource of an AMS of a central processing unit (Central Processing Unit, CPU for short) is 10% to 15%. A fourth preset threshold is 5%. Therefore, when 360 Total Security runs on the background, an occupied resource already exceeds the fourth preset threshold.

For the foregoing two cases, the AMS also buffers the broadcasts to be received by the two application programs.

Optionally, in some application programs, if all broadcasts for the application program are buffered, some inconvenience may be caused. For example, 360 Total Security may receive some broadcasts about a spam short message or a nuisance call. If all the broadcasts are buffered, 360 Total Security cannot immediately block these short messages or broadcasts, and this disturbs a user. Alternatively, some broadcasts are important broadcasts, and need to be processed immediately by the user. If these broadcasts are also frozen, inconvenience may also be caused to the user.

Therefore, in another specific example of this embodiment, only a preset frozen broadcast may be frozen. The preset frozen broadcast includes a statically-configured system broadcast and a dynamically-determined non-system broadcast. The preset frozen broadcast may be displayed in a broadcast list. To make a reader better understand an expression form of the preset frozen broadcast, a table is drawn in this embodiment to illustrate a type of the preset frozen broadcast and a composition form of the broadcast list. Certainly, this is just an example. Another manner may also be used as the expression form of the preset frozen broadcast. This is not limited herein. All broadcasts in the broadcast list are merely limited examples, and cannot represent all broadcasts in the broadcast list.

A specific expression form of the broadcast list is shown in Table 1:

TABLE 1

| | Broadcast type | | |
|---|---|---|---|
| | | | Broadcast that |
| | | Broadcast | causes a system |
| | Frequently-sent | with multiple | to get stuck |
| | broadcast | receivers | instantaneously |
| Statically-configured system broadcast | | | |
| Broadcast name | Battery level broadcast | Screen-on or screen-off broadcast | WiFi broadcast |
| Dynamically-configured non-system broadcast | | | |
| Broadcast name | QQ heartbeat wake-up broadcast | WeChat heartbeat wake-up broadcast | WeChat third-party plug-in broadcast |

After receiving a broadcast, the AMS matches the broadcast with the broadcast list. When it is determined that a broadcast is in the broadcast list, it indicates that the broadcast is a preset frozen broadcast. If an application program to which the broadcast is to be sent meets any one of the foregoing described broadcast buffering conditions, the broadcast is buffered in the memory. Otherwise, according to a corresponding rule, the broadcast is distributed to a corresponding application program.

To reduce a quantity of frozen broadcasts, and improve system performance, in another specific example of this embodiment, if the AMS recognizes that broadcasts sent by the broadcast sending party are a same broadcast or a same type of broadcast, for example, the sent broadcasts are battery level broadcasts, a value of a battery level that is displayed in a previously frozen and buffered battery level broadcast is 90%, but a value displayed in a battery level broadcast at a current time is 89%, the AMS deletes the previously frozen broadcast, and then freezes the battery level broadcast at the current time, that is, buffers only the battery level broadcast of 89% in the memory. Similarly, if the sent broadcasts are the same type of broadcast, for example, screen-on and screen off broadcasts, the screen-on broadcast is currently stored in the memory, but a broadcast that needs to be frozen at a current time is the screen-off broadcast, the AMS deletes the screen-on broadcast currently stored, and then freezes the screen-off broadcast at the current time, that is, buffers the screen-off broadcast at the current time in the memory, thereby saving resources and improving system performance.

Certainly, corresponding to freezing of the broadcast, the AMS is further used to unfreeze the frozen broadcast. The specific unfreezing conditions are specifically described above. Details are not described herein. Only an unfreezing process is described. For a specific process, refer to a signaling flowchart of unfreezing a broadcast shown in FIG. 5(a) and FIG. 5(b).

Figure 5:
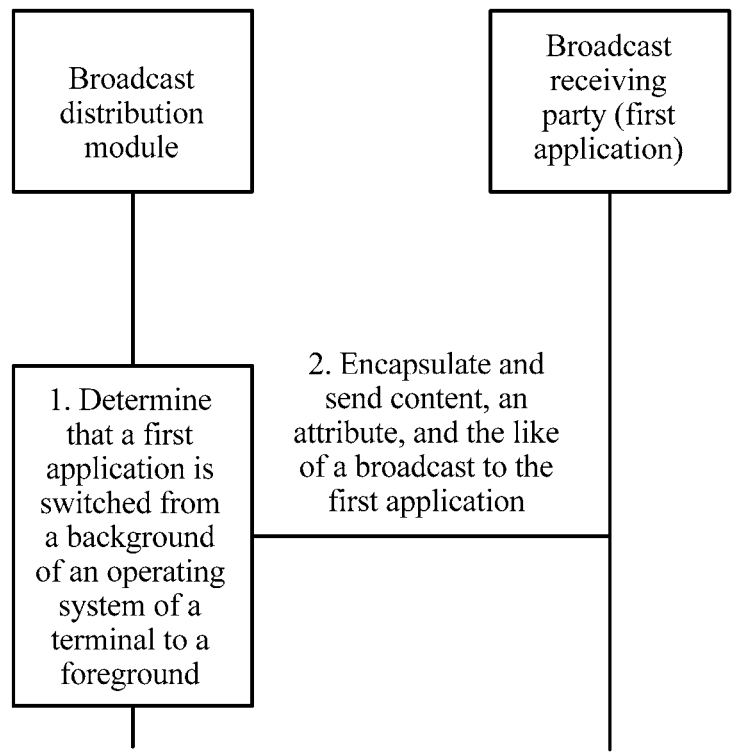
FIG. 5(a) and FIG. 5(b) are a signaling flowchart of unfreezing a broadcast according to an embodiment of the present invention.
Figure 5B:
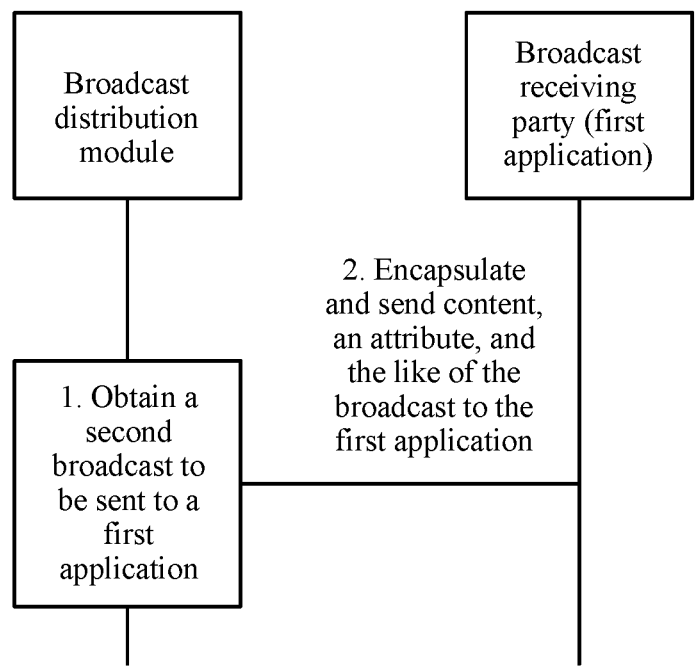

FIG. 5(a) and FIG. 5(b) are a signaling flowchart of unfreezing a broadcast according to an embodiment of the present invention. A specific signaling flowchart of unfreezing a broadcast is shown in FIG. 5(a) and FIG. 5(b). FIG. 5(a) is a signaling flowchart of unfreezing a broadcast when it is detected that an application is switched from a background to a foreground. FIG. 5(b) is a signaling flowchart of unfreezing a broadcast when an AMS obtains a second broadcast to be sent to a first application.

Specifically, when a frozen broadcast meets any one of the unfreezing conditions described in step 440 in FIG. 4(a) to FIG. 4(c), a broadcast distribution module extracts the frozen broadcast from a buffer, determines which broadcast receiving parties to which the frozen broadcast needs to be sent, then encapsulates attributes of the broadcast (for example, a process ID and/or a user ID of a broadcast sending party, the broadcast sending party, the broadcast receiving party, and a process ID and/or a user ID of the broadcast receiving party) and content of the broadcast, so as to form a broadcast record, and successively sends the broadcast record to the broadcast receiving party.

According to the broadcast control method provided in this embodiment of the present invention, when it is identified that one or more application programs are running on a background, and meet a specific condition, a broadcast to be received by the one or more application programs is frozen. In this way, the following problems are resolved: The one or more application programs frequently receive a broadcast on the background, and this causes a system to get stuck; excessive power consumption of a terminal device causes the terminal device heated; and the like. In addition, system performance is further improved. When the one or more application programs are switched from the background to a foreground to run, and/or meet a second preset condition, the broadcast for the one or more application programs may be unfrozen. Therefore, the one or more application programs can conveniently process the broadcast to be received by the one or more application programs.

Figure 6:
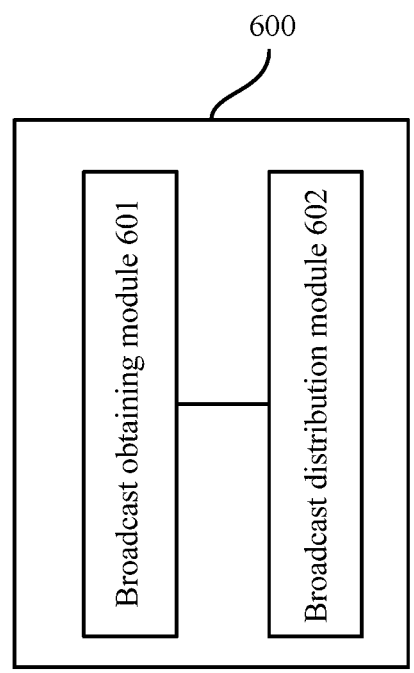
FIG. 6 is a schematic structural diagram of a broadcast control apparatus according to an embodiment of the present invention.

Corresponding to the foregoing embodiment of the broadcast control method, an embodiment of the present invention further provides a broadcast control apparatus. FIG. 6 is a schematic structural diagram of a broadcast control apparatus 600 according to an embodiment of the present invention. As shown in FIG. 6, the apparatus includes: a broadcast obtaining module 601 and a broadcast distribution module 602.

The broadcast obtaining module 601 is configured to: when a first application runs on a background of an operating system of a terminal, obtain a first broadcast to be sent to the first application.

The broadcast distribution module 602 is configured to buffer the first broadcast and stop sending the first broadcast to the first application.

Optionally, the broadcast distribution module 602 is further configured to determine that a running characteristic of the first application meets a first preset freezing condition, where the running characteristic of the first application includes a background continuous runtime of the first application in the operating system of the terminal, and the first preset freezing condition includes that a background continuous runtime of an application is greater than a preset runtime.

Further optionally, the broadcast distribution module 602 is further configured to determine that the first broadcast belongs to a preset frozen broadcast. The preset frozen broadcast includes at least one of a preset system broadcast or a preset second-application broadcast.

Further optionally, the broadcast distribution module 602 is further configured to determine that a running characteristic of the first broadcast meets a second preset freezing condition, where the running characteristic of the first broadcast includes a receiver quantity of the first broadcast, and the second preset freezing condition includes that a receiver quantity of a broadcast is greater than a preset receiver quantity; or determine that a running characteristic of the first broadcast meets a second preset freezing condition, where the running characteristic of the first broadcast includes transmission frequency of the first broadcast, and the second preset freezing condition includes that transmission frequency of a broadcast is higher than preset transmission frequency.

Optionally, the broadcast distribution module 602 is further configured to: obtain a third broadcast to be sent to the first application;

determine whether the third broadcast and the first broadcast belong to a same type of broadcast; and if the third broadcast and the first broadcast belong to a same type of broadcast, buffer the third broadcast and delete the buffered first broadcast.

Corresponding to buffering of the first broadcast, the broadcast distribution module 602 is further configured to unfreeze the first broadcast and send the first broadcast to the first application.

An unfreezing condition may include the following:

The broadcast distribution module 602 is further configured to detect that the first application is switched from the background of the operating system of the terminal to a foreground to run; or the broadcast distribution module is further configured to obtain a second broadcast to be sent to the first application, where the second broadcast belongs to a preset important broadcast.

For specific method actions performed by all function modules in this embodiment, refer to steps of the broadcast control method. For concise description, details are not described herein.

It should be further understood that, in the embodiment that is of the broadcast control method and that is corresponding to this embodiment, an Android system is used as an example for description. Therefore, the broadcast distribution module is described by using an AMS as an example. However, the present invention can be applied not only to the Android system, but also to another system. Therefore, the broadcast distribution module may be presented in another form in another application system. This is not limited herein.

According to the broadcast control apparatus provided in this embodiment, when it is identified that one or more application programs are running on a background and meet a specific condition, a broadcast that is to be received by the one or more application programs is frozen. In this way, the following problems are resolved: The one or more application programs frequently receive a broadcast on the background, and this causes a system to get stuck; excessive power consumption of a terminal device causes the terminal device heated; and the like. In addition, system performance is further improved. When the one or more application programs are switched from the background to a foreground to run, and/or meet an unfreezing condition, the broadcast for the one or more application programs may be unfrozen. Therefore, the one or more application programs can conveniently process the broadcast to be received by the one or more application programs.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processing module, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

What is claimed is:

1. A broadcast control method, wherein the method is applied to a terminal, a first application runs in an operating system of the terminal, and the method comprises:

when the first application runs on a background of the operating system of the terminal, buffering a first broadcast to be sent to the first application and stopping sending the first broadcast to the first application.

2. The method according to claim 1, wherein before the buffering the first broadcast to be sent to the first application and stopping sending the first broadcast to the first application, the method further comprises:

determining that a running characteristic of the first application meets a first preset freezing condition, wherein the running characteristic of the first application comprises a background continuous runtime of the first application in the operating system of the terminal, and the first preset freezing condition comprises that a background continuous runtime of an application is greater than a preset runtime.

3. The method according to claim 1, wherein before the buffering the first broadcast and stopping sending the first broadcast to the first application, the method further comprises:

determining that the first broadcast belongs to a preset frozen broadcast, wherein the preset frozen broadcast comprises at least one of a preset system broadcast or a preset second-application broadcast.

4. The method according to claim 1, wherein before the buffering the first broadcast and stopping sending the first broadcast to the first application, the method further comprises:

determining that a running characteristic of the first broadcast meets a second preset freezing condition, wherein the running characteristic of the first broadcast comprises a receiver quantity of the first broadcast, and the second preset freezing condition comprises that a receiver quantity of a broadcast is greater than a preset receiver quantity; or determining that another running characteristic of the first broadcast meets a third preset freezing condition, wherein the another running characteristic of the first broadcast comprises transmission frequency of the first broadcast, and the third preset freezing condition comprises that transmission frequency of a broadcast is higher than preset transmission frequency.

5. The method according to claim 1, wherein after the buffering the first broadcast and stopping sending the first broadcast to the first application, the method further comprises:
   unfreezing the first broadcast and sending the first broadcast to the first application.

6. The method according to claim 5, wherein before the unfreezing the first broadcast, the method further comprises:
   detecting that the first application is switched from the background of the operating system of the terminal to a foreground to run.

7. The method according to claim 5, wherein before the unfreezing the first broadcast, the method further comprises:
   obtaining a second broadcast to be sent to the first application, wherein the second broadcast belongs to a preset important broadcast.

8. The method according to claim 1, wherein after the buffering the first broadcast, the method further comprises:
   obtaining a third broadcast to be sent to the first application;
   determining whether the third broadcast and the first broadcast belong to a same type of broadcast; and
   if the third broadcast and the first broadcast belong to a same type of broadcast, buffering the third broadcast and deleting the buffered first broadcast.

9. A terminal, wherein the terminal comprises:
at least one processor; and
a non-transitory computer-readable storage medium coupled to the at least one processor and storing programming instructions for execution by the at least one processor, the programming instructions instruct the at least one processor to perform operations comprising:
when a first application runs on a background of an operating system of the terminal, buffering a first broadcast to be sent to the first application and stopping sending the first broadcast to the first application.

* * * * *